United States Patent [19]

Smolen

[11] 4,003,654
[45] Jan. 18, 1977

[54] CONTACT PRINT TEST WINDOW

[75] Inventor: William G. Smolen, Jamaica, N.Y.

[73] Assignee: The Raymond Lee Organization, Inc., New York, N.Y.; a part interest

[22] Filed: May 30, 1975

[21] Appl. No.: 582,074

[52] U.S. Cl. .................................. 355/125; 355/74
[51] Int. Cl.$^2$ ........................................ G03B 27/28
[58] Field of Search .............................. 355/72–74, 355/122–127, 132, 133, 78

[56] References Cited

UNITED STATES PATENTS

| | | | |
|---|---|---|---|
| 2,246,920 | 6/1941 | Kromholz | 355/126 X |
| 2,834,273 | 5/1958 | Bartilotta | 355/123 |
| 2,915,941 | 12/1959 | Finberg | 355/72 X |
| 3,709,591 | 1/1973 | Alzmann | 355/126 |

Primary Examiner—R. L. Moses
Attorney, Agent, or Firm—Daniel Jay Tick

[57] ABSTRACT

A sheet of opaque material has a window therein and marks on the sheet indicating the positioning of an edge of a test print for placement over the window to expose different areas of the test print in succession.

2 Claims, 2 Drawing Figures

CONTACT PRINT TEST WINDOW

DESCRIPTION OF THE INVENTION

The present invention relates to a contact print test window.

The normal procedure for making contact prints from a negative, without the use of an enlarger, involves the use of a contact printer in the darkroom. The negative is placed on the glass face of the printer. The printing paper is placed over the negative, a large format cover is placed over the paper and a light illuminates the negative for the desired period of time. The print is then placed in a developer, and rinsed, fixed and washed until it is finished.

In order to determine the desired period of time for the illumination of the negative, the usual procedure requires cutting of the printing paper into strips. Each strip is placed on the printer and is illuminated for a test period of time. Each strip is then processed in the aforedescribed manner, for development.

The strips of printing paper are individually exposed to light for precisely determined periods of time and are placed in the developer for precisely the same period of time. It is difficult to be so precise with a plurality of small strips.

Objects of the invention are to provide a contact photoprint testing device of simple structure, which is simple and inexpensive in manufacture, utilized with facility, convenience and rapidity, and permits four test strips to be prepared on one paper, thereby eliminating the need to cut a printing paper into four strips.

Figure 1:
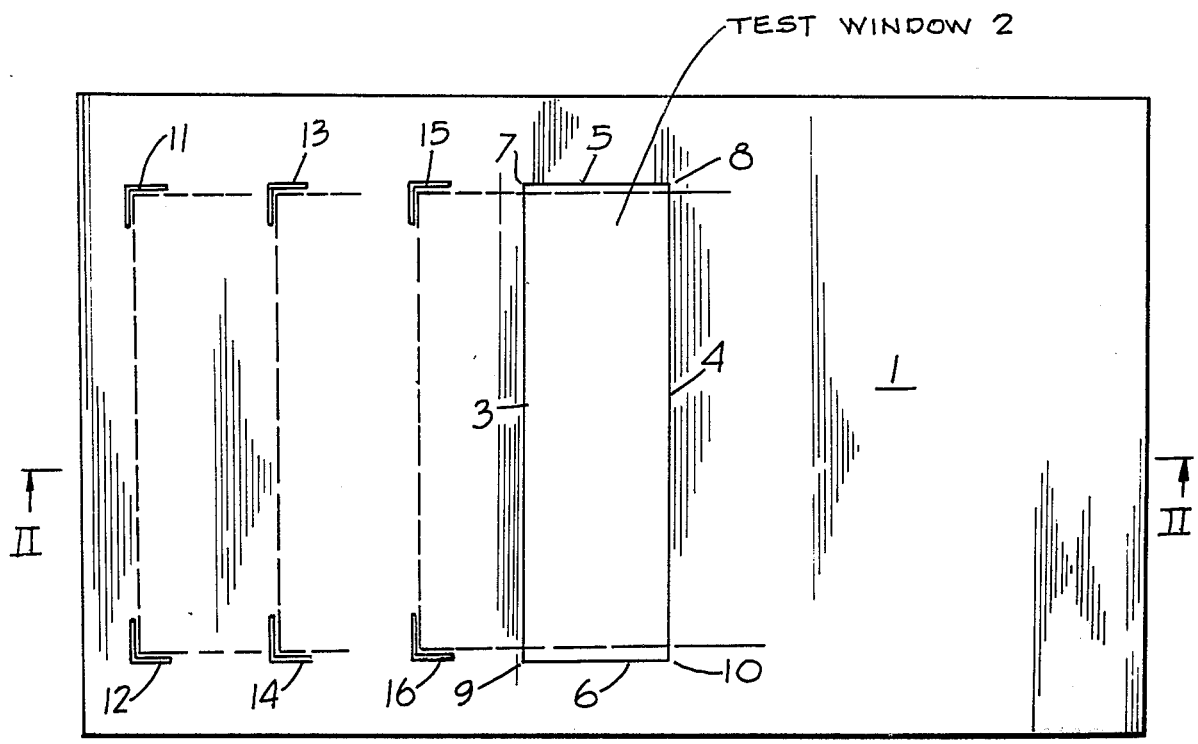
Figure 2:
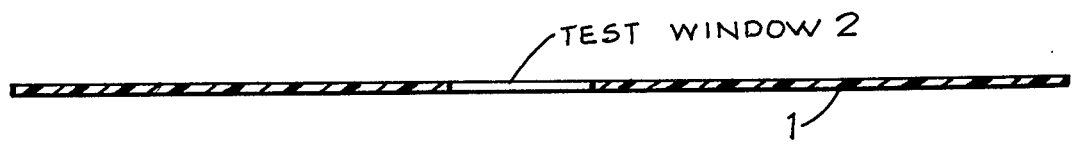

In order that the invention may be readily carried into effect, it will now be described with reference to the accompanying drawing, wherein:

FIG. 1 is a top plan of an embodiment of the contact photoprint testing device of the invention; and FIG. 2 is a cross-sectional view, taken along the line II—II of FIG. 1.

In the FIGS., the same components are identified by the same reference numerals.

The contact photoprint testing device of the invention comprises a sheet 1 of opaque material such as, for example, black plastic. The sheet 1 has a transparent test window 2 therein. The window 2 may be a hole formed through the sheet, and is substantially rectangular having four sides 3, 4, 5 and 6 and four corners 7, 8, 9 and 10, as shown in FIG. 1.

Marks, indications, or the like, 11, 12, 13, 14, 15 and 16 are provided on the sheet 1, as shown in FIG. 1, for indicating the positioning of an edge of a test print for placement over the window to expose different areas of the test print in succession. Thus, the marks comprise a plurality of pairs of corner indications 11 and 12, 13 and 14, and 15 and 16 at different distances from the pair of corners 7 and 9 of the window.

The test print is first positioned with the corners of one edge at the corner indications 11 and 12, and the exposure is made. The test print is then moved with the same edge and the same corners to the corner indications 13 and 14 for the next exposure. The test print is moved with the same edge and the same corners to the corner indications 15 and 16 for the third exposure. The test print is then moved with its same edge approximately coincident with the side 3 of the window for the last exposure.

While the invention has been described by means of a specific example and in a specific embodiment, I do not wish to be limited thereto, for obvious modifications will occur to those skilled in the art without departing from the spirit and scope of the invention.

I claim:

1. A contact photoprint testing device, comprising a sheet of opaque material having a substantially rectangular window positioned in the center of said sheet, said window having four sides and four corners, said sheet having marks thereon indicating the positioning of an edge of a test print for placement over the window to expose different areas of the test print in succession, said marks comprising a plurality of pairs of corner indications at different distances from a pair of corners of the window whereby a test print is first positioned with the corners of one edge at the corner indications farthest from the window for exposure and is successively positioned at the indications closer to the window for exposure.

2. A contact photoprint testing device as claimed in claim 1, wherein the sheet of opaque material is black plastic and the window is a hole formed through the sheet.

* * * * *